United States Patent [19]

Piper

[11] 3,938,478

[45] Feb. 17, 1976

[54] ROTARY INTERNAL COMBUSTION ENGINE

[76] Inventor: Jack N. Piper, 103 Collins Ave., Pleasantville, N.J. 08232

[22] Filed: Apr. 29, 1974

[21] Appl. No.: 464,909

[52] U.S. Cl. .............................. 123/8.33; 418/267
[51] Int. Cl.² ......................................... F02B 53/00
[58] Field of Search .......... 123/8.33, 8.45; 418/143, 418/148, 266, 267

[56] References Cited

UNITED STATES PATENTS

| 719,222 | 1/1903 | Huyck | 418/266 X |
| 943,592 | 12/1909 | Braley | 418/226 X |
| 1,531,470 | 3/1925 | Wilson | 418/148 X |
| 2,052,492 | 8/1936 | Seibold | 123/8.45 |
| 2,674,234 | 4/1954 | Riggle | 418/143 X |
| 2,728,330 | 12/1955 | Petersen | 123/8.45 X |
| 3,076,446 | 2/1963 | Lockhart | 123/8.45 X |
| 3,840,238 | 10/1974 | Sabet | 418/143 X |

FOREIGN PATENTS OR APPLICATIONS

| 656,229 | 2/1938 | Germany | 123/8.45 |
| 292,168 | 1/1932 | Italy | 123/8.45 |

Primary Examiner—Carlton R. Croyle
Assistant Examiner—Michael Koczo, Jr.
Attorney, Agent, or Firm—Howard I. Forman

[57] ABSTRACT

A concentric, valveless internal combustion engine is provided, consisting essentially of a rotary piston which revolves in a casing about a central shaft. The rotary piston contains combustion cavities distributed equidistantly around its perimetral wall surface. The casing contains combustion chambers and adjoining exhaust ports, and fuel intake manifolds in spaced relationship from one another. One or more means for igniting the fuel mixture is/are distributed at spaced intervals which are designed to provide timed ignitions of the fuel mixtures. Means are provided for starting the engine's rotation, and for feeding it a fuel-air mixture. As the piston rotates it carries the fuel mixture from the intakes to the points of fuel ignition, then to combustion chambers where the ignited fuel gases expand rapidly, and next to ports where the gases are exhausted from the engine. As the gases are formed the explosive force of their expansion against a certain portion of the engine housing and certain unique gate members causes the piston to rotate around the central shaft. The gate members are situated adjacent each combustion cavity. These gates are mounted for reciprocal movement radially into and out from the peripheral wall surface of the rotor. Sealing elements on the gates enable the gates to sweep the fuel-mixture to the combustion cavities, the gases being compressed en route with the help of shaped manifolds in the housing wall, and to sweep the burnt gases out of the combustion cavities and expansion chamber into and out through the exhaust ports.

15 Claims, 10 Drawing Figures

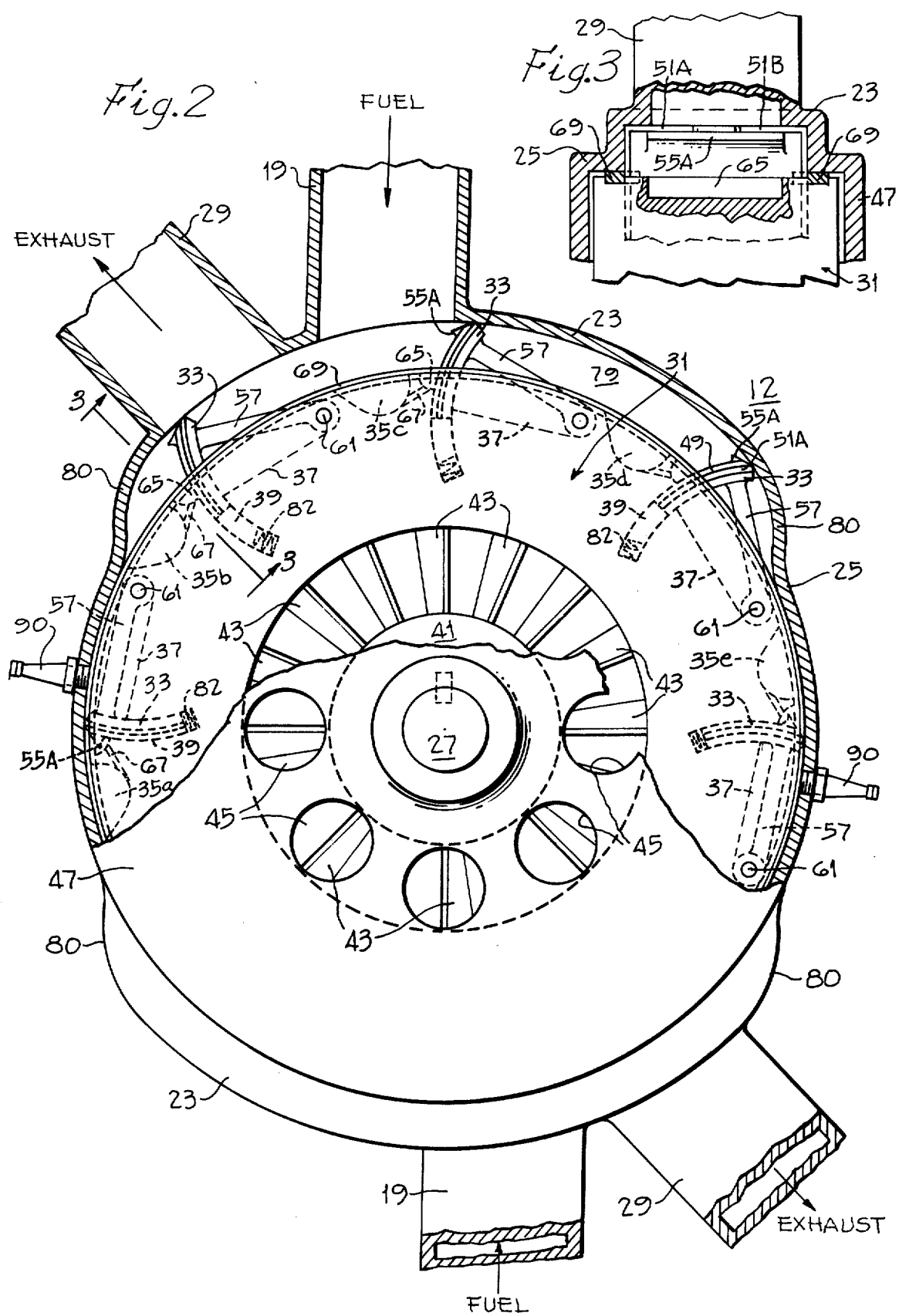

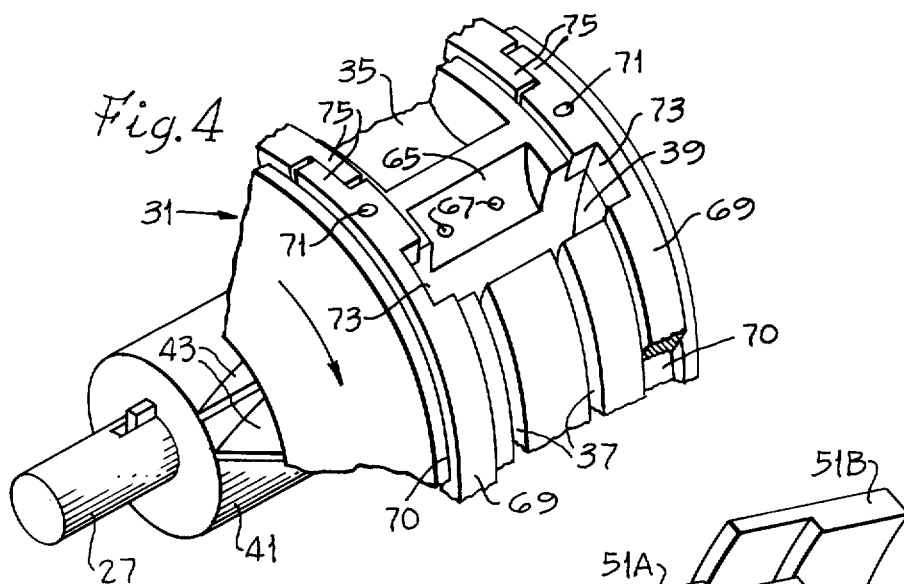
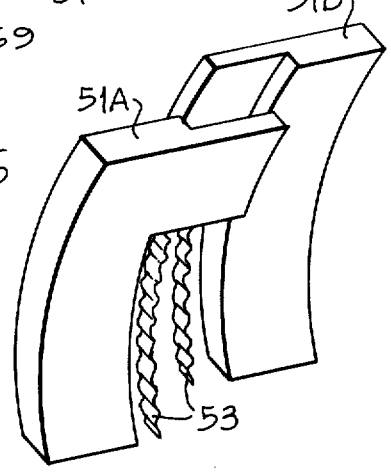
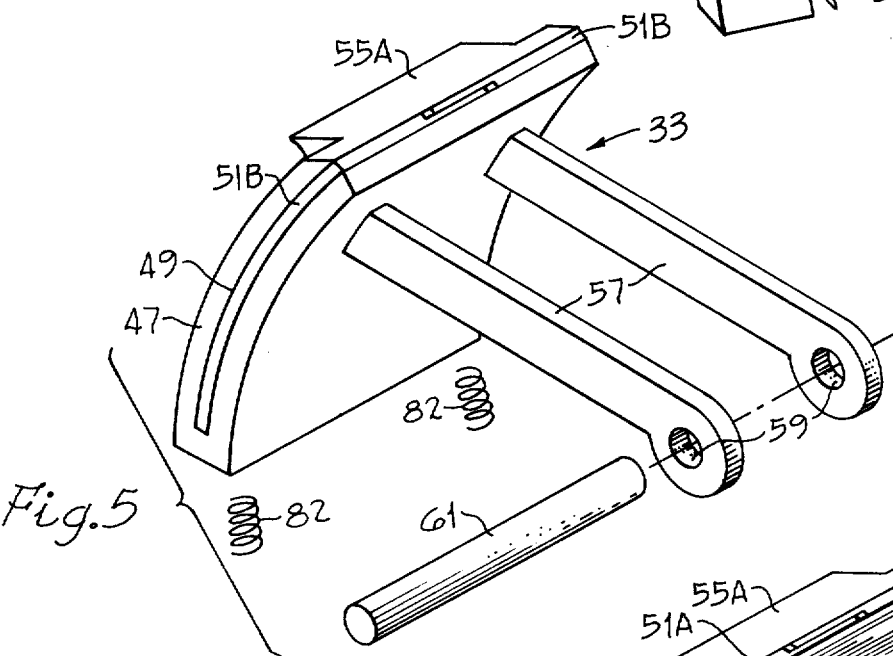
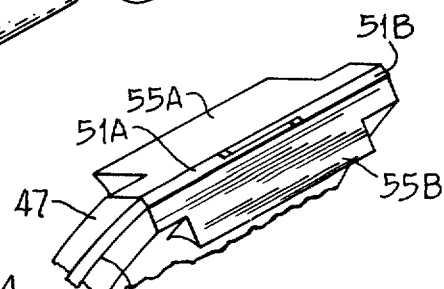

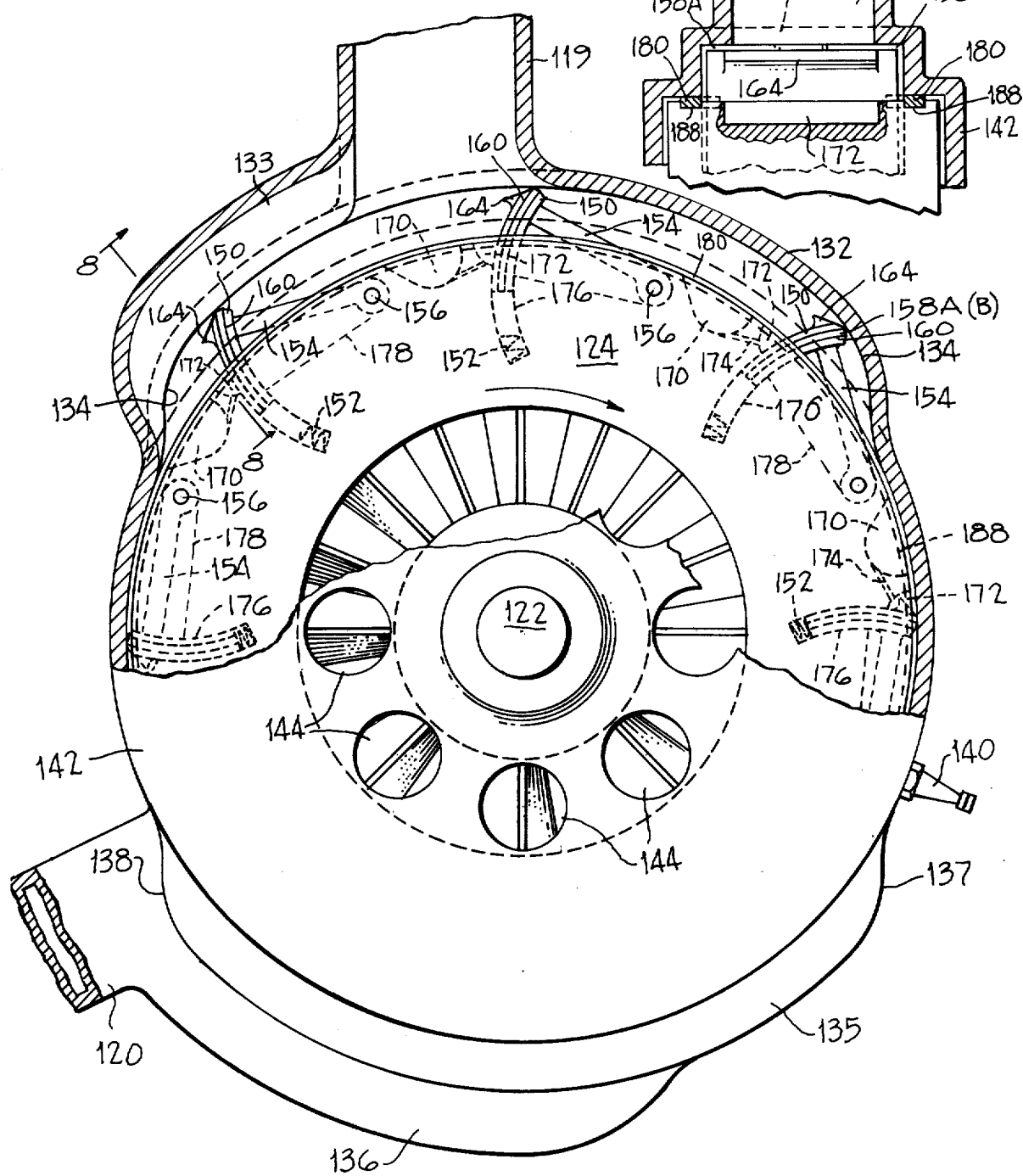

ROTARY INTERNAL COMBUSTION ENGINE

This invention has reference to rotary engines of the internal combustion type. More particularly, it pertains to multi-cycle engines in which each revolution results from several combustion cycles occurring in sequence.

It is a principal object of my invention to provide a concentric and valveless engine which may use either fuel with an ignition system or the diesel engine principle utilizing direct fuel injection and combustion by compression.

A further object of my invention is to provide a rotary piston design which eliminates the need for eccentric rotary devices, planetary gear systems, and complex machining of its prior art counterparts.

A still further object is to provide an almost continuous power impulse per revolution of the rotary piston member, which compares much more favorably than the three power impulses per revolution inherent in the leading pre-existing rotary engines.

The foregoing and other comparable objects are achieved by means of a concentric circular rotor or rotary piston operating in a casing therefor. In the designs utilizing an ignition system there is provided one or more sources of ignition through the casing wall at spaced intervals, one or more fuel intake manifolds, and one or more combustion chambers each of which leads into an adjacent and contiguous exhaust port through which gases are vented from the casing.

The rotor freely rotates around a central drive shaft. At equi-distant points around the perimeter of the rotor there are provided a number of arcuate-shaped compression/combustion gate members. Each gate member is mounted so as to move under centrifugal force or spring-loaded pressure radially outward from the peripheral surface of the rotor, and radially inward into arcuate radial slots in the rotor under the urging of cam-like portions of the casing's wall. At the radially outermost edge of each gate member there are provided gate sealing elements whose outer perimetral surfaces are sealingly in contact with the inner surface of the casing wall.

At symmetrically spaced intervals about the rotor's perimetral surface there are provided combustion cavities or pockets so shaped and designed that when a portion of one of them is adjacent the opening from a fuel intake manifold a portion of that pocket is adjacent the opening into a combustion chamber and/or its contiguous exhaust port.

In FIG. 2 of the accompanying illustrations the overall appearance of the rotor may be seen as somewhat resembling a paddle wheel. The planar surface of the rotor may further be likened to that of a circular saw blade in which the spaces between the saw-like "teeth" portions are the combustion cavities or pockets. Between each adjacent pair of these pockets there is a slot in the rotor's peripheral surface which is elongated and whose longer dimension is in a circumferential direction. Each elongated slot serves to house a pair of pivot arms for one of the gate members when the gate is in the radially innermost extent of its travel. Each elongated slot at one end is perpendicular to and connects with an adjacent arcuate radial slot.

As the description of the invention proceeds its advantages over pre-existing engines will become apparent, particularly in view of the closer cooperation which it makes possible between the pocket-like combustion chambers and the rotor during the compression of the air-gasoline mixture, the ignition, the expansion of the combustion gases, and the scavenging of waste or spent gases.

The design, construction and operation of my invention will be better understood from the detailed description which follows, particularly when reference is made to the following drawings, wherein:

FIG. 2 is a partial cross-section of the engine through the housing and rotor of the FIG. 1 version, the sectional showing being along a plane which is transverse the axis of the rotor's rotation;

FIG. 3 is a fragmentary section taken substantially on lines 3—3 of FIG. 2 to show, in partial front elevation, a gate member and an adjacent portion of the casing in sealing relationship with each other;

FIG. 4 is a fragmentary view in perspective, of the rotor showing the apertures provided for receiving the reciprocating gate member and the attendant combustion chambers;

FIG. 5A shows, in fragmentary perspective, the functional end of the FIG. 5 gate member modified to provide two oppositely placed projecting lips.

FIG. 5 is an isometric view of one of the gate members and its associated seals;

FIG. 6 is a perspective showing of the two-part sealing members of FIG. 5 and their associated spring elements, both members and elements having been removed from one of the gate members;

Figure 1:
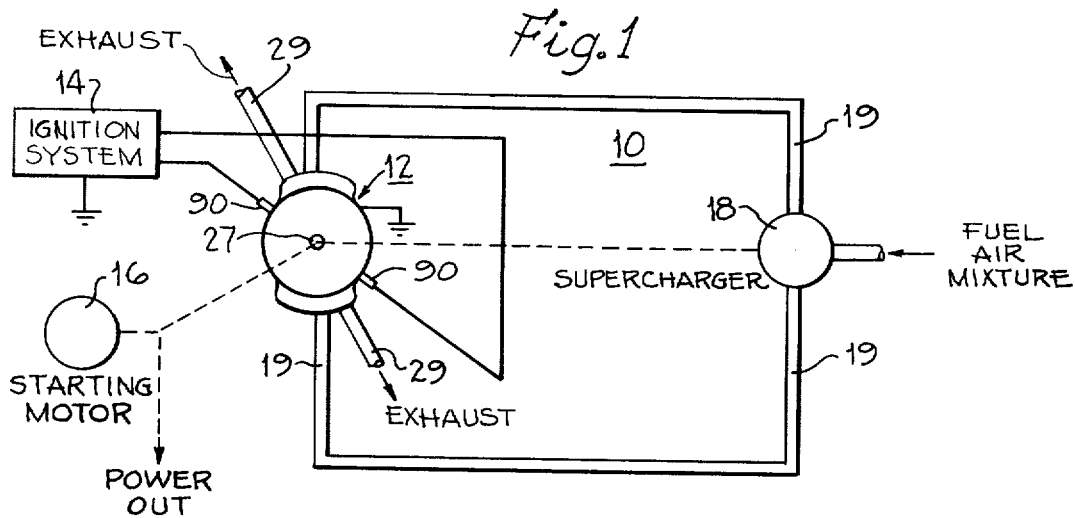
FIG. 1 is a schematic diagram of the overall system of a machine incorporating the engine of the present invention in which there is utilized a super-charged, mechanically aspirated or pumped fuel system.
Figure 1A:
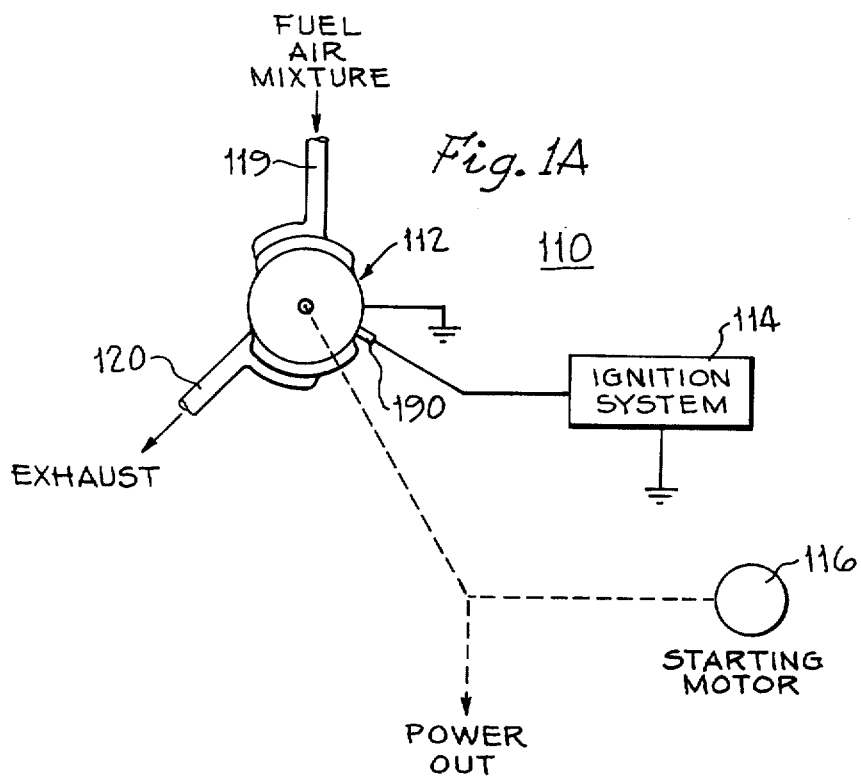
FIG. 1A is a modified version of the FIG. 1 system, there being no super-charger or pump. Instead, the fuel is naturally aspirated directly to the point of its ignition rather than being forced by the supercharger to the fuel intake manifolds.

FIG. 7 is a partial cross-section of the engine through the housing and rotor of the FIG. 1A version, the sectional showing being along a plane which is transverse the axis of the rotor's rotation; and FIG. 8 is a fragmentary section taken substantially on lines 8—8 of FIG. 7 to show the interrelationships of the gate sealing elements, the cam-like portion of casing, the manifold and the fuel intake.

Referring to the drawings, the general engine assembly 10 has an operating motor 12 shown in FIG. 1 provided with a conventional fuel ignition system 14, an electric starting motor 16 for initially turning over the engine rotor, and a supercharger or compressor 18 for introducing a combustible mixture of fuel and air under pressure to the motor. Simply stated, the motor's operation consists in furnishing fuel from compressor 18 through a suitable supply line or intake means 19, then through the walls of manifolds 23 which are concentric with the cylindrical motor housing or casing 25 into the interior of the engine. Combustion of the fuel and expansion of the resulting gases takes place in the engine, thereby creating the power which applies a torque to turn the engine's central drive shaft 27, the spent gases being swept from the engine through exhaust ports 29.

More definitively explained, by reference to FIGS. 2-3-4-5-5A-6, two basic keys to the improved performance of the present invention over the prior art reside in the unique cylindrical rotor 31 and the arcuate gate members 33. The rotor has, at equally spaced points around its perimetral surface, scooped-out pockets forming combustion cavities 35. For ease of reference the combustion cavities exposed in FIG. 2 have been labelled consecutively, from left to right, 35a–35e inclusive. Between each consecutive pair of such cavities is an elongated slot 37 which is positioned so that a consecutive series of such slots collectively form a regularly interrupted circumferential recess or channel around the peripheral wall of the rotor. At one end of each elongated slot 37, roughly perpendicular thereto and connected therewith, is an arcuate radially directed slot 39. The purpose for slots 37 and 39 will be discussed below.

The rotor 31 is secured to the motor's central drive shaft 27 by means of a hub member 41. The rotor proper and its hub are interconnected by canted vanes 43 which serve the further purpose of helping to direct outside air into the engine's interior for cooling purposes. The outside air is admitted through apertures 45, shown in circular configuration in FIG. 2, through the engine's end walls.

The arcuate gate members 33 have the configuration best shown in FIGS. 5–5A–6. Each gate member consists of a housing 47 having a milled groove 49 in which are fitted two interlocking sealing elements 51A–51B. Resilient members such as springs 53 are held between the interlocking surfaces of elements 51A–51B so as to provide each element with a lateral thrust acting as if to diverge them from each other. Optionally, but preferably, there may be provided projecting lips 55A–55B on the radially outward extremity of each of the sealing elements.

Projecting from the wall of each arcuate gate member 33 having the smaller of its two radii, almost perpendicular to that wall surface, are a substantially parallel pair of pivot arms 57. At the free extremity of each of those arms is an opening or hole 59 extending therethrough. The holes 59 in each pair of pivot arms are exactly the same shape and size and are in substantial axial alignment with each other. Passing through each pair of holes 59 is a pivot pin 61 which is mounted between the opposing end walls of the rotor, thereby providing a support for pivot arms 57 about which gate member 33 can pivot as it undergoes its reciprocal movement into and out from slots 37 and 39 of rotor 31.

Earlier, mention was made of the arcuate gate member's projecting lips 55A–55B. When the gate member is retracted fully into slots 37 and 39 in the rotor member 31, lip 55A is seated entirely within recess 65 in the peripheral face of the rotor. If the gate member has the optional lip 55B it, too, is seated entirely within a corresponding recess (not shown) in the rotor's face. One or more passageways 67 are provided for ready communication between combustion pockets 35 and the lip-accommodating recess 65.

On the edges of the rotor are ring seals 69 (see FIG. 4) seated within accommodating grooves 70 therefor. Pins 71 are provided for securing seals 69 in position. Notches 73 are cut into the rotor's peripheral wall surface to admit into each notch one of the arcuate gate members 33 at the same time that the gate's pivot arms 57 are admitted into corresponding slots 37. When each gate and its pivot arms are completely depressed into the rotor's wall surface, as seen in the first (on the extreme left) and last (on the extreme right) positions of the gate members laid bare in the FIG. 2 showing, the lip-like portion 55 (see FIG. 5) of the gate member is accommodated in recess 65 therefor as stated above. Ring seals 69, it will further be noted, matingly overlap each other (see FIG. 4) by their ends 75. Serving to keep the gate members and their pivot arms and lips fully depressed into the rotor wall are the transitional portions of housing 25 which have the cam-like "ogee" configuration 80 shown in FIG. 2. When the gate members are free of the urging to move radially inward provided by cam-like housing portions 80, springs or other resilient members 82, in conjunction with centrifugal force providing radial thrust outward, provide the thrust that urges the gate members to move radially outward to their fully extended positions which they have when they are in the vicinity of the gas exhaust and fuel intake ducts as shown in FIG. 2.

Ignition of the fuel-air mixture is provided by one or more spark plugs or other ignitors 90 mounted so as to extend through housing 25 wall. When more than one spark plug is employed they are located in timed circumferential relationship to each other and to the fuel intakes 19 and gas exhaust means 29 so as to provide the sparks which they emit at even intervals timed with the movement of the fuel mixture to the points where it is to be ignited.

With the various parts of the invention as illustrated in the drawings having each been described, a description of their cooperative functions may now be presented. Referring first to FIGS. 1–2, the electric starting motor 16 is turned on so as to commence turning central drive shaft 27 in clock-wise direction. Next, the fuel-air mixture is supplied under pressure through carburetor or supercharger 18, through fuel intake means 19, inside the motor housing 25 expanded or transitional portions having the cam-like ogee configuration designated by reference character 80.

As the drive shaft rotates it likewise causes rotor 31 to rotate, and with the rotor the arcuate gate members 33 rotate whether in their fully, radially outward extended positions or in their intermediate or fully, radially inwardly depressed positions. In their radially outward, fully extended positions the gate members serve to sweep the exhaust gases out through exhaust ducts 29 and, further along in their clockwise movement with the rotor, they also seem to sweep the fuel mixture received through fuel intake means 19 to one of the combustion pockets 35 that has become positioned adjacent spark plug 90. Ignition and construction of the fuel mixture takes place in that pocket. Shortly afterward, as the clockwise movement of the rotor continues, that pocket is brought to the vicinity of the ogee portion 80 of the housing wall 25 whereupon the gases are enabled to escape by expansion out of the pocket and into the adjacent exhaust duct 29.

The thus emptied combustion pocket is moved on by further rotor rotation to a point where it is adjacent the next fuel intake means 19 where it receives a quantity of new fuel. Still futher clockwise movement causes the fuel to become compressed into the combustion pocket by virtue of the fact that the gate member adjacent to that pocket is being compressed into radial slot 39 by the cam-like action of ogee 80. As this occurs lips 55 of the gate member are pushed into their accommodating recesses 65. Still further along in the rotary cycle, as the gate member is once again freed from the cam-like urging of housing wall 25, the exhaust gases in pocket 35 start to escape through passageway 67 into recess 65 where some of the gases become trapped behind lips 55 and serve thereby to urge gate member 33, together with the aid of springs 82 in conjunction with centrifugal force providing radial thrust outward, to extend fully out of slots 39.

As the arcuate gate members move reciprocally in and out of the rotor wall they are kept true in their travel by the parallel pivot arms 57 which pivot about pins 61. The slots 37 which serve to receive pivot arms 57 when the gate members are depressed also receive some of the exhaust gases which pass through recess 65, but these gases also are purged through the exhaust means 29 when slots 37 are adjacent thereto.

For ease of reference and description, in FIG. 2 the combustion pockets have been designated consecutively, from left to right in a clockwise direction, as 35a, 35b, 35c, etc. In 35a there is a supply of fuel-air mixture which was admitted when that pocket passed by fuel intake means 19 shown at the bottom of the drawing. By this point the mixture has been compressed by means of the arcuate gate member which preceded it having swept into the pocket all of the mixture it could hold under the given pressure and temperature conditions. When the rotor is moved a little more an instant later the mixture will pass beneath spark plug 90 to become ignited. Moments later the ignited mixture will reach the point represented by 35b and start to exhaust the gases caused by the ignition out through exhaust means 29. Helping this exhaustion step will be the gate member which follows into position adjacent the exhaust means. Then when the pocket reaches the position represented by 35c it is at a point where it will take on a new load of fuel air mixture from fuel intake 19 and the cycle will be resumed again.

It should be understood that the gases formed upon ignition of the mixture expand into chamber 79 upon leaving the combustion pocket and moving through passageway 67 to exert force against the projecting lips 55A of the gate members, thereby agumenting the radially outward force applied to the gate member by centrifugal force and expansion of spring 82 so as to open the gate and maintain it in sealing relationship with the inner surface of housing wall 25. The force exerted by the expanding gases acting between the ogee portion of the housing and against the face of the gate member also imparts a torque to the rotor which is transmitted to shaft 27 so as to aid the shaft's clockwise rotation. It may be noted that as the gate member is forced open it moves in a direction away from the force generated by the gaseous products of combustion. In so doing the gate member presents a direct surface, in the form of the deflector surface formed by lip-like portions 55 of the gate members, which the combustion forces may act upon. At the same time there is presented a lesser negative force along the upper trailing canted surface of the gate member which acts to help close the gates.

As the rotor turns, the fuel mixture and gases are sealed from leakage in several ways. The ring seals 69 on the edges of the rotor itself serve for this purpose as they are in brush contact with the inner surface of housing wall 25. Springs 53 which provide divergent lateral thrusts to gate sealing elements 51A–51B serve to keep down leakage past the outsides of the arcuate gate member. The thrusts provided by springs 82 and the exhaust gases under gate member projecting lips 55, together with the aid of centrifugal force, serve to keep the radially outward leading edges of elements 51A–51B against the inner wall surfaces of housing 25, including ogee portions 80. Sealing of the fuel mixture in the combustion pockets by means of the gate member which follows each pocket has been explained previously.

As the motor operates heat is generated. For increased efficiency cooling of the motor is desirable. Aiding in such cooling by blowing of air under pressure are the vanes 43 which serve as spokes connecting the rotor to the hub 41. The apertures 45 provided through the end walls of the motor housing permit convenient entrance of the air to the vanes.

The actual configurations of the rotor or any of the designated and illustrated parts are illustrative only, and may be varied in numerous ways without departing from the spirit and scope of the invention. Mainly such variations will be in the nature of dimensional adjustments based upon the number of fuel and air intake manifolds and exhaust ports that are employed, the size of the engine proper, etc. The size, depth and breath of the combustion cavities or pockets can be empirically altered to suit different conditions caused by variations in the nature and efficacy of the fuel charges and the amount of torque imparted when those charges are ignited.

The compression ratio which is achieved when the fuel mixture is forced into and sealed in the combustion pockets is a function of the size of the compression/expansion chamber 79 (the expanded transitional portion of the housing) to the size of each combustion cavity 35. The illustrated design utilizes eight gates and combustion cavities which serve to provide 16 power impulses per revolution. However, the shape and number may vary according to the application desired. The simultaneous compression and combustion equalizes bearing loads so as to prevent unnecessarily high ones from developing. Lubrication may be by oil mixed with the fuel or oil pumped through a drilled shaft and out to the gates, pivots and housing walls, or sprayed directly to the housing and rotor periphery. Cooling of the motor may be by water and/or the illustrated air-cooling system. Additional seals on the gates and rotor may be used if desired. The duration of intake, compression, combustion and exhaust may be shortened or lengthened by changing the housing and minifold configuration accordingly. More than one ignitor or injector may be used per ignition/combustion point.

In the FIG. 1A version of the invention the fuel is naturally aspirated. The exhaust and intake manifolds are modified from the FIG. 1 design and the supercharger is eliminated. Forced evacuation and induction is provided in lieu of the superchargers. The impact of these modifications is a 50 percent reduction in the number of power impulses per revolution. The modifications accomplish forced evacuation and induction in the following manner, which can best be explained by reference to FIGS. 1A, 7 and 8. The general schematic for the motor assembly is designated as 110. The motor proper is 112 and the ignition system is 114. The electric starting motor is 116. The fuel intake means is 119 and the exhaust is 120. Other pertinent parts to note are central drive shaft 122, rotor member 124, hub 126, vanes 128, cylindrical housing 130 having a manifold 132 at the fuel intake zone and an auxiliary manifold 133 to enlarge the intake zone. The transitional portion 134 of manifold 132 has a cam-like configuration as shown.

An exhaust manifold 135 and an auxiliary exhaust manifold 136 are provided, each with transitional portions of cam-like configurations designated by 137–138. A spark plug 140 is shown mounted so as to extend through the housing wall into the combustion chamber. The remaining parts may be identified as the housing end walls 142, the circularly spaced apertures 144 in end walls 142, arcuate gate members 150 uniformly spaced peripherally about the circumferential face of rotor 124, springs 152, gate pivot arms 154, pivot pins 156 for the gates pivot arms, gate sealing elements 158 A–B, milled grooves 160 to retain elements 158, springs to provide side thrust to elements 158, projecting lips 164 on gate members 150, combustion pockets 170 spaced around the peripheral surface of the rotor, recesses 172 adjacent the combustion pockets to accomodate lips 164, communicating passageways 174 between combustion pockets 170 and recesses 172, arcuate slots 176 to receive gates 150, slots 178 to receive arms 154 of gates 150, ring seals 180 on the edges of the rotor, pins 182 to secure seals 180, notches 184 to admit gates 150 overlapped ends 186 of ring seals 180, and grooves 188 to receive the ring seals. Each of these parts will be readily understood to perform the same functions of their counterparts which have been described in detail with reference to FIGS. 1 and 2.

The compression, ignition and power application are identical to the previously described supercharged apparatus. The exhaust port preferably is somewhat elongated to allow the gates to be cammed into the closed position by the housing, but still having access to the exhaust port except for that gas which is contained in the rotor combustion cavity. The gate then is allowed to reopen in the elongated intake port section, and in opening there is created a larger area which must be filled by drawing in the fresh charge from the intake port. The fresh charge is therefore drawn into the compression chamber the same as in a four cycle engine and the cycle is then repeated.

In conclusion, it may be seen from the foregoing description that my invention basically consists of means for transporting a compressible combustible charge from the fuel intake to the point of combustion and subsequent expansion or reaction chamber, then exhaust. The engine, as has been made clear, is valveless and its main moving part is concentric. Unlike prior art rotary engine devices no mechanically actuated valve system is employed, nor is there any mechanically induced eccentric rotation of parts.

A highly critical and novel feature of the invention is the use of the series of arcuate-shaped gate members and combustion pockets equi-spaced about the periphery of the rotor. The reciprocatable gates serve to help sweep and compress the fuel-mixture into the combustion pockets, seal the pockets, and, being driven by the forces generated by combustion of the fuel, sweep the burnt gases out of the engine later as the rotor moves on to successive rotational positions. At the same time the gate members serve to seal against gas leakage between the rotor and the motor housing with a minimum amount of friction since the pivot arms eliminate the friction which the gates would have by bearing against the slots due to the compression and combustion forces if the pivot arms were not utilized.

As previously mentioned, and as will surely be apparent to those persons familiar with combustion engines and the diesel engine principle, the diesel principle may be utilized in the practice of this invention with some simple substitutions for various parts described above. Diesel oil is, of course, used in place of gasoline for the fuel. Diesel fuel, injectors and injector pumps are used in place of igniters and carburetors. And, finally, the compression ratio must be raised to the required levels to achieve combustion. The operation and function of all previously described parts and the engine itself will perform as presented in the preceding pages.

I claim:

1. In a valveless, concentric rotary internal combustion engine which imparts a rotary motion to a power shaft by the contained and directed expansion of its exhaust gases, a substantially hollow cylindrical housing having closed end walls and further having throughout its length main walls with cross-sectional dimensions consisting of two different radii, each main wall portion having the larger radius being gradually tapered at each of its circumferential extremities to a continuous juncture with the adjacent wall portion having the smaller radius, a central shaft rotatably mounted so as to extend axially between the two end walls of said housing, a cylindrically shaped rotary piston mounted within said housing so as to revolve about said central shaft with the piston's outer circumferential wall surface in piston-cylinder relationship to the interior surface of said housing's main wall portions having the smaller of the two radii, a plurality of combustion pockets spaced equally from each other around and depressed into the peripheral wall surface of said rotary piston, a plurality of slots extending radially inward from the peripheral wall surface of said rotary piston with each slot being located forward of an adjacent combustion pocket in the direction of rotation of said rotary piston, at least one passageway extending from a combustion pocket to the slot adjacent thereto so as to enable combustion gases to escape from the combustion pocket and expand into the adjacent slot, a gate member mounted for reciprocatable movement into and partially out from each said slot so that as the rotary piston rotates centrifugal force urges each gate member to move radially outward so that its outer extremity is constantly in contact with the interior main wall surfaces of said housing, at least one projecting lip near the radially outward extremity of the gate member which serves to trap gases escaping from the combustion chamber through the connecting passageway and adjacent slot which accommodates that lip in a manner which supplements centrifugal force in urging the gate member in a radially outward direction, a gas exhaust port leading from said housing's wall portion having the larger radius, a fuel inlet port located in the same housing wall portion forward of the exhaust port in the direction of rotation of said rotary piston, means for igniting fuel extending interiorly through the housing's main wall portions having the smaller radius, and means for starting the rotation of said central shaft and its attached rotary piston.

2. The engine of claim 1 which is mechanically associated by means of a supercharger incorporated in the air intake system.

3. The engine of claim 1 in which resilient means are located in each of said slots radially inward behind the gate member mounted therein so as to supplement centrifugal force in urging the gate member in a radially outward direction.

4. The engine of claim 1 in which there are provided spring loaded seals on the peripheral edges of the rotary piston sealed within accommodating grooves therefor, pins for securing said seals in those grooves in proper sealing position, and overlapping ends of each seal serving to minimize leakage of the combustion gases past those seal ends.

5. The engine of claim 1 in which each gate member has extending substantially perpendicular thereto an arm which is pivotably secured at the arm's other extremity to the rotary piston so as to aid in the radially inward and outward reciprocatable movement of the gate member with relation to the slot in which it is mounted.

6. The engine of claim 5 in which there is provided an elongated slot within the peripheral surface of the rotary piston to receive substantially the full length of the gate member's arm when the gate member is withdrawn substantially entirely into its accommodating slot extending radially into the piston's peripheral wall surface.

7. The engine of claim 6 in which there is further provided an elongated recess associated at one of its ends with the elongated slot and at the other of its ends with an adjacent combustion pocket, whereby combustion gases issuing from said pocket are readily directed by a connecting passageway through the recess and slot to the gate members's projecting lip.

8. The engine of claim 1 in which each gate member has as its radially outward extremity a bearing surface which is in constant sealing relationship with the inner main wall surfaces of said housing.

9. The engine of claim 1 in which each gate member is comprised of two inter-fitting sealing elements, and resilient means mounted between said elements so as to provide lateral thrusts to each element in opposite directions to each other so as to urge them into sealing relationships with the end walls of said housing.

10. The engine of claim 1 in which each gate member and each accommodating slot therefor have arcuate shapes, with the gate member's and the slot's surfaces having the smaller radius preceding the surfaces of the gate member's and slot's larger radius as the piston is rotated.

11. The engine of claim 1 in which there is provided a central hub which is mounted for rotation on the central shaft, and interconnecting spoke-like vanes connecting the piston to said central hub.

12. The engine of claim 11 in which the vanes are canted so as to draft air into the interior of the engine to augment internal engine cooling.

13. In a valveless, concentric rotary internal combustion engine which imparts a rotary motion to a power shaft by the contained and directed expansion of its exhaust gases, a substantially hollow cylindrical housing having closed end walls and further having throughout its length main walls with cross-sectional dimensions consisting of two different radii, each main wall portion having the larger radius being gradually tapered at each of its circumferential extremities to a continuous juncture with the adjacent main wall portion having the smaller radius, a central shaft rotatably mounted so as to extend axially between the two end walls of said housing, a cylindrically shaped rotary piston mounted within said housing so as to revolve about said central shaft with the piston's outer circumferential wall surface in piston-cylinder relationship to the interior surface of said housing's main wall portions having the smaller of its two radii, a plurality of combustion pockets spaced equally from each other around and depressed into the peripheral wall surface of said rotary piston, a plurality of slots extending radially inward from the peripheral wall surface of said rotary piston with each slot being located forward of an adjacent combustion pocket in the direction of rotation of said rotary piston, at least one passageway extending from a combustion pocket to the slot adjacent thereto so as to enable combustion gases to escape from the combustion pocket and expand into the adjacent slot, a gate member mounted for reciprocatable movement into and partially out from each said slot so that as the rotary piston rotates centrifugal force urges each gate member to move radially outward so that its outer extremity is constantly in contact with the interior main wall surfaces of said housing, at least one projecting lip near the radially outward extremity of the gate member which serves to trap gases escaping from the combustion chamber through the connecting passageway and adjacent slot which accommodates that lip in a manner which supplements centrifugal force in urging the gate member in a radially outward direction, a gas exhaust port leading from said housing's wall portion having the larger radius, a diesel fuel inlet port located in the same housing wall portion forward of the exhaust port in the direction of rotation of said rotary piston, and means for starting the rotation of said central shaft and its attached rotary piston.

14. In a valveless, concentric, rotary internal combustion engine having a housing, a cylindrically shaped piston mounted for rotary movement in said housing, combustion pockets in the piston's peripheral wall surface opposed to the inner wall surface of the engine's housing, a variable volume working chamber defined by the inner surface of the engine's housing on one side and opposite thereto the piston's wall surface, said working chamber providing the space necessary for receiving the fuel and alternate compression of gases after the gases are ignited followed by exhaustion of the gases from the chamber, gate members pivotably mounted on said piston for substantially frictionless reciprocatable movement so as alternately to compress combustion gases in the piston's combustion pockets and permit the gases to be released therefrom, said gate members each having extending substantially perpendicular thereto an arm which is secured at the arm's other extremity to the rotary piston, at least one projecting lip near the radially outward extremity of the gate member which serves to trap gases emerging from the combustion pockets in a manner which supplements centrifugal force in a radially outward direction, elongated slots within the peripheral surface of the rotary piston to receive the gate member's arms, and elongated recesses each associated at one of its ends with an adjacent combustion pocket whereby combustion gases issuing from the pocket are readily directed by a connecting passageway through the recess and slot to the gate member's projecting lip.

15. The engine of claim 14 in which the gate members have two major opposed surfaces, one facing in the direction of rotation of the rotary piston and the other facing away from that direction of rotation, the former surface aiding in the compression of the fuel-air mixture and the latter surface aiding in the expansion of the combustion gases and in the torque applied thereby to the rotary piston.

* * * * *